United States Patent
Asaishi

(10) Patent No.: US 11,603,476 B2
(45) Date of Patent: Mar. 14, 2023

(54) PHOTOLUMINESCENT COATING MATERIAL

(71) Applicant: Fujikura Kasei Co., Ltd., Tokyo (JP)

(72) Inventor: Noritaka Asaishi, Kuki (JP)

(73) Assignee: Fujikura Kasei Co., Ltd., Tokyo (JP)

( * ) Notice: Subject to any disclaimer, the term of this patent is extended or adjusted under 35 U.S.C. 154(b) by 0 days.

(21) Appl. No.: 16/348,614

(22) PCT Filed: Nov. 30, 2017

(86) PCT No.: PCT/JP2017/043048
§ 371 (c)(1),
(2) Date: May 9, 2019

(87) PCT Pub. No.: WO2018/105483
PCT Pub. Date: Jun. 14, 2018

(65) Prior Publication Data
US 2019/0276683 A1    Sep. 12, 2019

(30) Foreign Application Priority Data
Dec. 7, 2016   (JP) .............................. JP2016-237247

(51) Int. Cl.
*C09D 5/22* (2006.01)
*C09D 7/20* (2018.01)
(Continued)

(52) U.S. Cl.
CPC .................. *C09D 5/22* (2013.01); *C09D 5/29* (2013.01); *C09D 5/38* (2013.01); *C09D 7/20* (2018.01); *C09D 7/40* (2018.01); *C09D 7/70* (2018.01); *C09D 175/06* (2013.01); *C09D 201/00* (2013.01)

(58) Field of Classification Search
CPC ... C09D 5/22; C09D 7/20; C09D 7/70; C09D 7/40; C09D 5/29; C09D 5/38; C09D 175/06; C09D 201/00
See application file for complete search history.

(56) References Cited

U.S. PATENT DOCUMENTS 4,530,958 A * 7/1985 Kasari ................ C09D 133/066
524/315

FOREIGN PATENT DOCUMENTS

| JP | 59105064 A | 6/1984 |
| JP | 04202486 A | 7/1992 |

(Continued)

OTHER PUBLICATIONS

Asahi Kasei Aluminum Paste. https://www.akcpc.jp/en/alumipaste/grade/index.html. Accessed Sep. 21, 2020. (Year: 2020).*
(Continued)

*Primary Examiner* — John E Uselding
(74) *Attorney, Agent, or Firm* — Wood Herron & Evans LLP

(57) ABSTRACT

A photoluminescent coating material which contains: a hydrocarbon-based solvent (A) that has an aniline point of 40° C. or higher; a resin (B1) that is incompatible with the hydrocarbon-based solvent (A); a solvent (C) that is compatible with the hydrocarbon-based solvent (A) and the resin (B1) while having a lower boiling point than the hydrocarbon-based solvent (A); and a scale-like aluminum (D).

6 Claims, 1 Drawing Sheet

(51) Int. Cl.
　　　*C09D 7/40*　　　(2018.01)
　　　*C09D 175/06*　　(2006.01)
　　　*C09D 201/00*　　(2006.01)
　　　*C09D 5/29*　　　(2006.01)
　　　*C09D 5/38*　　　(2006.01)

(56) References Cited

FOREIGN PATENT DOCUMENTS

| | | |
|---|---|---|
| JP | 09111176 A | 4/1997 |
| JP | 10237373 A | 9/1998 |
| JP | 2001081359 A | 3/2001 |
| JP | 2001240787 A | 9/2001 |
| JP | 2002038096 A | 2/2002 |
| JP | 2004307672 A | 11/2004 |
| JP | 2004313983 A | 11/2004 |
| JP | 2006152259 A | 6/2006 |
| JP | 2008098312 A | 4/2008 |
| JP | 2012116988 A | 6/2012 |
| JP | 2014234454 A | 12/2014 |
| JP | 2015074711 A | 4/2015 |
| JP | 2016190958 A | 11/2016 |
| WO | 2015156032 A1 | 10/2015 |

OTHER PUBLICATIONS

Braskem Idesa. White Spirit Datasheet. Dec. 2017. (Year: 2017).*
European Patent Office, Search Report issued in EP 17878740.4 dated Jul. 3, 2020, 7 pages.
PCT Office, International Search Report issued in PCT/JP2017/043048 dated Feb. 13, 2018, 4 pages.
Japanese Patent Office, Office Action issued in JP 2016-237247 dated Feb. 21, 2017, 4 pages.
"Formulation Design and Preparation of Coatings," Shu You et al., Southwest Jiaotong University Press, p. 26, Aug. 2014.
Chinese Patent Office, Office Action issued in CN 201780074955.3 dated Jun. 23, 2021.

* cited by examiner

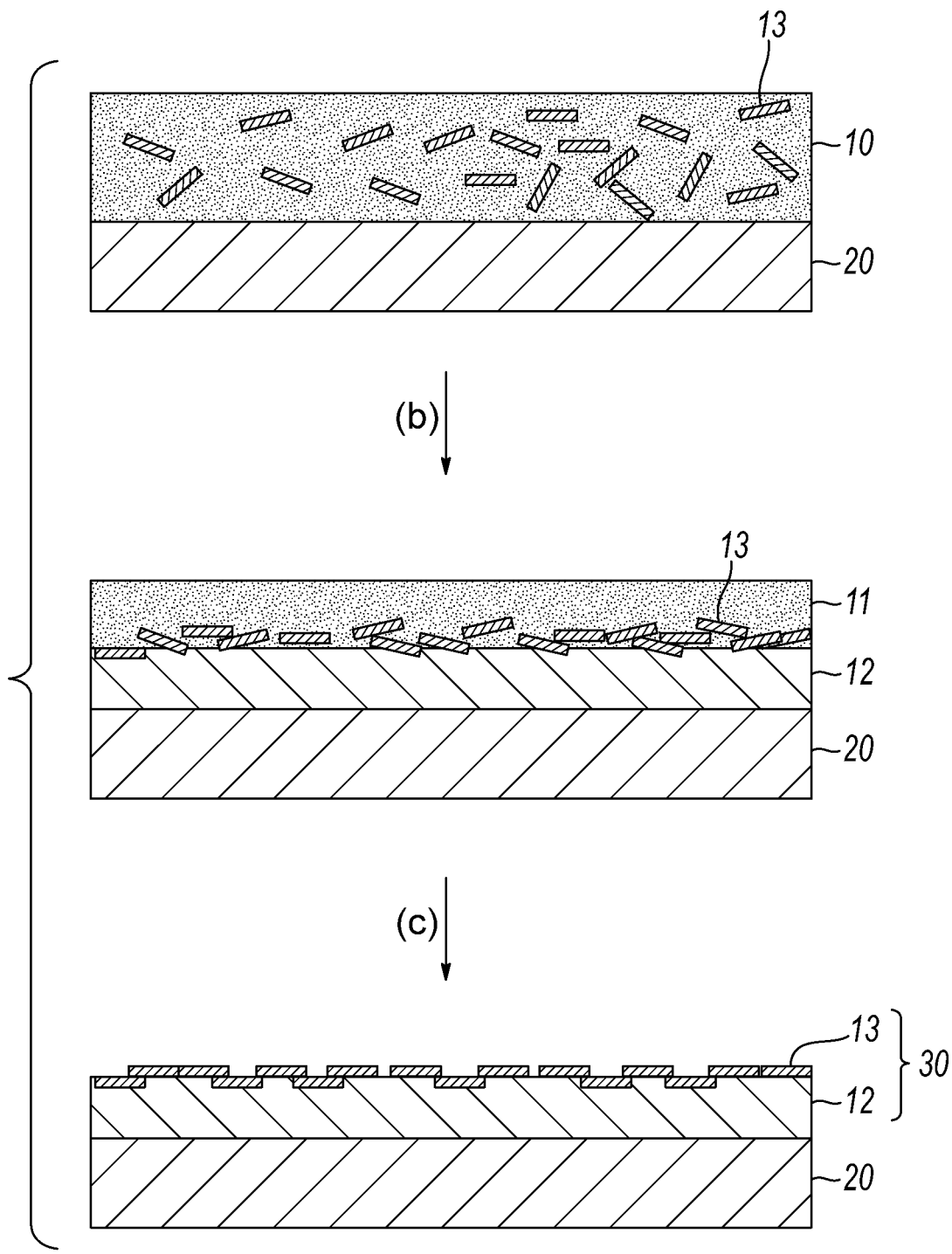

PHOTOLUMINESCENT COATING MATERIAL

TECHNICAL FIELD

The present invention relates to a photoluminescent coating material.

Priority is claimed on Japanese Patent Application No. 2016-237247, filed on Dec. 7, 2016, the content of which is incorporated herein by reference.

BACKGROUND ART

In order to enhance the designability or luxury feeling of the surfaces of interior and exterior components of automobiles, a variety of molded articles, and the like, there are cases where a thin metal film is formed on the surfaces. As a method for forming the thin metal film, a metal plating method, a metal evaporation method, and the like are known, but these methods require plating facilities or evaporation facilities.

Therefore, in recent years, photoluminescent coating materials obtained by blending a scale-like metal filler as a photoluminescent pigment have been used since operation steps are simple, and there are no limits on facilities or the sizes of coating subjects.

In order to form a coated film having photoluminescence using a photoluminescent coating material, it is necessary to orient a scale-like metal filler on the surface of the coated film parallel to the surface. As a method for orienting the scale-like metal filler parallel to the surface of the coated film, a method in which a rheological controlling agent is blended into the photoluminescent coating material or a leafing-type metal filler or metallic flakes obtained by crushing an evaporated thin metal film formed by evaporation are used as the scale-like metal filler is common.

However, in reality, there are many cases in which the metal filler is irregularly oriented on the surface of the coated film, and it is not easy to develop sufficient photoluminescence.

As a coating material capable of forming coated films that are excellent in terms of the orientation of photoluminescent pigments and have a rich metallic gloss feeling, for example, Patent Document 1 discloses a coating material obtained by adding a photoluminescent pigment having a hydrophilized or hydrophobized surface to a mixture of a hydrophilic resin and a hydrophobic resin.

According to Patent Document 1, it is disclosed that the hydrophilic resin and the hydrophobic resin are phase-separated, the photoluminescent pigment is eccentrically located in any layer of a layer of the hydrophilic resin and a layer of the hydrophobic resin, whereby coated films having a rich metallic gloss feeling can be formed.

PRIOR ART DOCUMENTS

Patent Documents

[Patent Document 1] Japanese Unexamined Patent Application, First Publication No. 2004-307672

SUMMARY OF INVENTION

Problems to be Solved by the Invention

However, in the coating material described in Patent Document 1, the photoluminescent pigment is dispersed in the hydrophilic resin layer or the hydrophobic resin layer, and thus it is not possible to exhibit sufficient photoluminescence at all times.

An object of the present invention is to provide a photoluminescent coating material capable of forming coated films having excellent photoluminescence.

Means for Solving the Problems

A photoluminescent coating material according to an aspect of the present invention contains: a hydrocarbon-based solvent (A) that has an aniline point of 40° C. or higher; a resin (B1) that is incompatible with the hydrocarbon-based solvent (A); a solvent (C) that is compatible with the hydrocarbon-based solvent (A) and the resin (B1) while having a lower boiling point than the hydrocarbon-based solvent (A); and a scale-like aluminum (D).

A polarity of the resin (B1) may be higher than a polarity of the hydrocarbon-based solvent (A).

Effects of Invention

According to the photoluminescent coating material according to the above-described aspect of the present invention, it is possible to form coated films having excellent photoluminescence.

BRIEF DESCRIPTION OF THE DRAWING FIGURES

The FIGURE shows cross-sectional views schematically showing an example of a process for forming a coated film using a photoluminescent coating material according to an embodiment of the present invention.

EMBODIMENTS FOR CARRYING OUT THE INVENTION

"Photoluminescent Coating Material"

A photoluminescent coating material according to an embodiment of the present invention contains: an (A) component; a (B1) component; a (C) component; and a (D) component described below. In other words, the photoluminescent coating material according to the present embodiment contains a hydrocarbon-based solvent (A) that has an aniline point of 40° C. or higher; a resin (B1) that is incompatible with the hydrocarbon-based solvent (A); a solvent (C) that is compatible with the hydrocarbon-based solvent (A) and the resin (B1) and has a lower boiling point than the hydrocarbon-based solvent (A), and a scale-like aluminum (D).

In addition, the photoluminescent coating material according to the present embodiment may contain a (B2) component described below or an optional component as necessary. The (B1) component and the (B2) component are also collectively referred to as "the (B) component".

(A) component: A hydrocarbon-based solvent having an aniline point of 40° C. or higher (B1) component: A resin that is incompatible with the (A) component (B2) component: A solvent that is incompatible with the (A) component (C) component: A solvent that is compatible with the (A) component and the (B1) component and has a lower boiling point than the (A) component (D) component: A scale-like aluminum <(A) Component>

The (A) component is a hydrocarbon-based solvent having an aniline point of 40° C. or higher.

When the (A) component has an aniline point of 40° C. or higher, although described in detail below, the (A) component is separated from the (B) component in a formation process of coated films, and a layer of the (A) component (hereinafter, referred to as "the A layer") and a layer of the (B) component (hereinafter, referred to as "the B layer") are formed. The upper limit value of the aniline point is not particularly limited, but is preferably 90° C. Solvents having a high aniline point generally have a large molecular weight, and thus there is a tendency that the boiling point of the solvents increases. When the aniline point is 90° C. or lower, the (A) component is likely to be easily volatilized by a heating treatment.

The aniline point is a value that is measured according to JIS K 2256:2013 (ISO 2977:1997).

Meanwhile, the aniline point refers to the lowest temperature at which a liquid mixture (volume ratio=1:1) of aniline and a specimen is present as a homogeneous solution (a temperature at which aniline and the specimen in a state of being fully blended together are separated from each other due to a decrease in temperature and the solution becomes turbid).

The (A) component is separated from the (B) component and then volatilized by a heating treatment in the formation process of coated films and thus seldom remains in the coated film in the end. That is, coated films that are formed using the photoluminescent coating material according to the present embodiment substantially do not include the (A) component.

As the (A) component, aliphatic hydrocarbon-based solvents, unsaturated hydrocarbon-based solvents, and the like are exemplary examples.

As the aliphatic hydrocarbon-based solvents, paraffins represented by a compositional formula $C_{na}H_{2na+2}$ (here, na≥6), monocyclic naphthenes represented by a compositional formula $C_{nb}H_{2nb}$ (here, nb≥7) and alkyl group adducts thereof, and bicyclic naphthenes represented by a compositional formula $C_{nc}H_{2nc-2}$ and alkyl group adducts thereof are exemplary examples. Specific examples thereof include normal paraffins such as normal hexane, normal heptane, normal octane, normal nonane, normal decane, and the like; isoparaffins such as isooctane, isononane, isodecane, and the like; monocyclic naphthenes such as cycloheptane, methylcyclohexane, ethylcyclohexane, nonylcyclohexane, and the like; bicyclic naphthenes such as decahydronaphthalene and the like; and the like. One of these aliphatic hydrocarbon-based solvents or a combination of two or more of these aliphatic hydrocarbon-based solvents may be used.

Examples of the unsaturated hydrocarbon-based solvents include limonene, diisobutylene, and the like.

One of these unsaturated hydrocarbon-based solvents or a combination of two or more of these unsaturated hydrocarbon-based solvents may be used.

The boiling point of the (A) component is preferably 80° C. to 220° C., more preferably 100° C. to 200° C., and still more preferably 120° C. to 180° C. When the boiling point of the (A) component is in the above-described range (80° C. to 220° C.), in the formation process of coated films, the (A) component is likely to be volatilized by a heating treatment after being separated from the (B) component.

The amount of the (A) component is preferably 5% to 40% by mass and more preferably 10% to 35% by mass of the total mass of the photoluminescent coating material. When the amount of the (A) component in the photoluminescent coating material is too great, the proportion of the (B1) component that is a main component of the coated film decreases, and there is a case where thick application becomes necessary in order to obtain coated films having a desired film thickness. In addition, the proportion of the (C) component decreases, consequently, it becomes difficult to make the (A) component and the (B) component compatible with each other, and there is a case where it becomes difficult to obtain homogeneous photoluminescent coating materials.

On the other hand, when the amount of the (A) component is too small, there is a tendency for it to become difficult for the interface between the A layer and the B layer to be sufficiently formed in the formation process of coated films.

<(B1) Component>

The (B1) component is a resin that is incompatible with the (A) component.

The (B1) component is a main component of coated films that are formed using the photoluminescent coating material according to the present embodiment.

In the present embodiment, the expression "incompatible" means that the (A) component and the (B) component are separated from each other, and the interface between the A layer and the B layer is formed.

The (B1) component preferably has a higher polarity than the (A) component. In other words, the polarity of the resin (B1) is preferably higher than the polarity of the hydrocarbon-based solvent (A). When the polarity of the (B1) component is higher than that of the (A) component, during the separation of the (A) component and the (B) component in the formation process of coated films, the B layer having a high polarity and a higher surface tension is located on the lower side of the A layer having a low polarity and a lower surface tension, and thus the (A) component is likely to be volatilized by a heating treatment.

As the (B1) component, from the viewpoint of easiness of increasing the polarity, a resin having a functional group (polar group) such as a hydroxy group or a carboxy group or an ether bond in the molecule is preferred. Examples of such a resin include polycarbonate diols, polyester polyols, and the like.

As the polycarbonate diols, compounds obtained by reacting a diol (for example, ethylene glycol, propylene glycol, 1,3-propanediol, 1,4-butanediol, 1,5-pentanediol, 1,6-hexanediol, 1,9-nonanediol, neopentyl glycol, or the like) and a carbonate (for example, dimethyl carbonate, diphenyl carbonate, ethylene carbonate, phosgene, or the like) and the like are exemplary examples.

As the polyester polyols, compounds obtained by reacting a dicarboxylic acid (for example, phthalic acid, isophthalic acid, terephthalic acid, maleic acid, fumaric acid, adipic acid, sebacic acid, or the lie) and a polyhydric alcohol (for example, ethylene glycol, propylene glycol, tetramethylene glycol, 1,4-butanediol, 1,6-hexanediol, neopentyl glycol, trimethylolpropane, pentaerythritol or the like); polycaprolactone oligomers; and the like are exemplary examples.

The (B1) component may include, in addition to the above-described polycarbonate diol and polyester polyol, a polyisocyanate compound or a melamine resin.

Examples of the polyisocyanate compound include isocyanurate bodies, biuret bodies, polyhydric alcohol adducts, modified bodies by an allophanate bond, and the like of pentamethylene diisocyanate, hexamethylene diisocyanate, tolylene diisocyanate, isophorone diisocyanate, xylylene diisocyanate, norbornene diisocyanate, 1,3-bis(isocyanatomethyl) cyclohexane, isophorone diisocyanate, hydrogenated xylylene diisocyanate, and hydrogenated diphenylmethane diisocyanate. One of these polyisocyanate compounds or a combination of two or more of these polyisocyanate compounds may be used.

Examples of the melamine resin include methylated melamine resins, normal butylated melamine resins, isobutylated melamine resins, and the like. One of these melamine resins or a combination of two or more of these melamine resins may be used.

The amount of the (B1) component is preferably 10% to 80% by mass and more preferably 15% to 70% by mass of the total mass of the photoluminescent coating material. When the amount of the (B1) component in the photoluminescent coating material is too great, the viscosity of the photoluminescent coating material increases, and there is a tendency for it to become difficult to obtain flat coated surfaces. On the other hand, when the amount of the (B1) component is too small, there is a case where thick application becomes necessary in order to obtain coated films having a desired film thickness. When the photoluminescent coating material is thickly applied, a longer period of time is taken for curing, some of the photoluminescent coating material flows (drips) and pools, and there is a case where the film thickness becomes partially thick.

<(B2) Component>

The (B2) component is a solvent that is not compatible with the (A) component.

In the formation process of coated films, the (B2) component is volatilized by a heating treatment before the separation from the (A) component or after the separation from the (A) component and thus seldom remains in the coated film in the end. That is, even when the photoluminescent coating material according to the present embodiment includes the (B2) component, coated films that are formed using the photoluminescent coating material according to the present embodiment substantially do not include the (B2) component.

The (B2) component is preferably a solvent having a functional group (polar group) such as a keto group, a hydroxy group, or a carboxy group, an element having an unshared electron pair such as nitrogen or sulfur, an ether bond, or the like in the molecule. Examples of such a solvent include cyclic carbonate-based solvents, polyhydric alcohols, ketone-based solvents, nitrogen element or sulfur element-containing aprotic polar solvents, and the like.

Examples of the cyclic carbonate-based solvents include ethylene carbonate, propylene carbonate, and the like. One of these cyclic carbonate-based solvents or a combination of two or more of these cyclic carbonate-based solvents may be used.

Examples of the polyhydric alcohols include ethylene glycol, propylene glycol, 1,2-butanediol, tetramethylene glycol, 1,3-propanediol, 1,4-butanediol, 1,6-hexanediol, neopentyl glycol, trimethylolpropane, pentaerythritol, and the like. One of these polyhydric alcohols or a combination of two or more of these polyhydric alcohols may be used.

Examples of the ketone-based solvents include diacetone alcohol, isophorone, and the like. One of these ketone-based solvents or a combination of two or more of these ketone-based solvents may be used.

Examples of the nitrogen element or sulfur element-containing aprotic polar solvents include N,N-dimethylformamide, 1,3-dimethyl-2-imidazolidinone, N-methyl-2-pyrrolidone, N-ethyl-2-pyrrolidone, dimethylsulfoxide, and the like. One of these aprotic polar solvents or a combination of two or more of these aprotic polar solvents may be used.

The boiling point of the (B2) component may be higher or lower than the boiling point of the (A) component; however, in the formation process of coated films, it is desirable that the upper-side A layer is preferentially volatilized by a heating treatment after the separation of the (A) component and the (B) component, and thus the boiling point of the (B2) component is preferably higher than the boiling point of the (A) component.

The boiling point of the (B2) component is preferably 150° C. to 300° C. and more preferably 180° C. to 250° C.

The amount of the (B2) component is preferably 60% by mass or less and more preferably 1% to 40% by mass of the total mass of the photoluminescent coating material. When the amount of the (B2) component in the photoluminescent coating material is too great, the proportion of the (B1) component that is a main component of the coated film decreases, and there is a case where thick application becomes necessary in order to obtain a coated film having a desired film thickness.

<(C) Component>

The (C) component is a solvent that is compatible with the (A) component and the (B1) component and has a lower boiling point than the (A) component.

In a case where the photoluminescent coating material contains the (B2) component, the (C) component is also preferably compatible with the (B2) component.

In the present embodiment, the expression "compatible" means that the (A) component and the (C) component, the (B1) component and the (C) component, and the (B2) component and the (C) component are not separated from each other, and no interface is formed between the respective components.

The (C) component volatilizes in the formation process of coated films and thus seldom remains in the coated film in the end.

That is, coated films that are formed using the photoluminescent coating material according to the present embodiment substantially do not include the (C) component.

As the (C) component, ketone-based solvents, alcohol-based solvents, ether-based solvents, ester-based solvents, glycol ether-based solvents, chain-like carbonate-based solvents, and the like are exemplary examples.

Examples of the ketone-based solvents include acetone, methyl ethyl ketone, diethyl ketone, methyl propyl ketone, methyl isobutyl ketone, and the like. One of these ketone-based solvents or a combination of two or more of these ketone-based solvents may be used.

Examples of the alcohol-based solvents include methanol, ethanol, normal propanol, isopropanol, normal butanol, isobutanol, 2-butanol, and the like. One of these alcohol-based solvents or a combination of two or more of these alcohol-based solvents may be used.

Examples of the ether-based solvents include diethyl ether, diisopropyl ether, methyl isobutyl ether, tetrahydrofuran, cyclopentyl methyl ether, and the like. One of these ether-based solvents or a combination of two or more of these ether-based solvents may be used.

Examples of the ester-based solvents include methyl acetate, ethyl acetate, normal propyl acetate, isopropyl acetate, normal butyl acetate, isobutyl acetate, secondary butyl acetate, methyl propionate, ethyl propionate, normal propyl propionate, methyl-2-methyl butyrate, and the like. One of these ester-based solvents or a combination of two or more of these ester-based solvents may be used.

Examples of the glycol ether-based solvents include ethylene glycol monomethyl ether, propylene glycol monomethyl ether, monoglyme, and the like. One of these glycol ether-based solvents or a combination of two or more of these glycol ether-based solvents may be used.

Examples of the chain-like carbonate-based solvents include dimethyl carbonate, ethyl methyl carbonate, and the like. One of these chain-like carbonate-based solvents or a combination of two or more of these chain-like carbonate-based solvents may be used.

The boiling point of the (C) component is lower than the boiling point of the (A) component. In a case where the photoluminescent coating material contains the (B2) component, the boiling point of the (C) component may be lower or higher than the boiling point of the (B2) component, but is preferably lower.

The boiling point of the (C) component is preferably 125° C. or lower and more preferably 50° C. to 100° C. When the boiling point of the (C) component is 125° C. or lower, the (C) component is likely to volatilize in the formation process of coated films.

The amount of the (C) component is preferably 10% to 80% by mass and more preferably 20% to 60% by mass of the total mass of the photoluminescent coating material. When the amount of the (C) component in the photoluminescent coating material is too great, the proportion of the (B1) component that is a main component of the coated film decreases, and there is a case where thick application becomes necessary in order to obtain a coated film having a desired film thickness. On the other hand, when the amount of the (C) component is too small, there is a case where an interface is generated between the (A) component including the (C) component and the (B) component including the (C) component and a layer is formed, and there is a case where uniform application becomes difficult.

<(D) Component>

The (D) component is a scale-like aluminum.

The (D) component is a component that imparts photoluminescence to coated films that are obtained from photoluminescent coating materials.

In the present embodiment, the expression "scale-like" means that the aspect ratio (average particle diameter/thickness) that is the ratio of the average particle diameter to the thickness of aluminum is 50 to 1,000.

In addition, the "average particle diameter" refers to the 50% particle diameter (D50%) that is measured using a laser diffraction and scattering method (Microtrac method).

The thickness of the aluminum is preferably 0.01 to 2 μm and more preferably 0.01 to 0.1 μm. Aluminum having a thickness of 0.01 μm or more is easy to manufacture and does not easily become transparent, and thus the degree of gloss of coated films increases. On the other hand, when the thickness of the aluminum is 2 μm or less, it is possible to maintain the appearance of coated films favorable. Particularly, when the thickness of the aluminum is 0.1 μm or less, it becomes easy to obtain coated films having a strong metallic tone.

The thickness of the aluminum is measured using an electron microscope.

The average particle diameter of the aluminum is preferably 2 to 30 μm and more preferably 5 to 20 μm. When the average particle diameter of the aluminum is 2 μm or more, it is easy to obtain aluminum having a thickness of 2 μm or less. On the other hand, when the average particle diameter of the aluminum is 30 μm or less, it becomes easy to obtain coated films having a smooth metallic tone.

As the (D) component, evaporated aluminum flakes, rolled aluminum flakes, and the like are exemplary examples. Among these, evaporated aluminum flakes are preferred from the viewpoint of easiness of obtaining coated films having a strong metallic tone.

In addition, aluminum having a surface treated with a surface treatment agent such as an aliphatic acid or a silane coupling agent, or aluminum coated with a transparent resin may also be used as the (D) component.

The expression "transparent" means that, when the surface of the (D) component is coated, the metallic tone of the (D) component is not impaired, and the total luminous transmittance is preferably 50% or more.

The evaporated aluminum flakes refer to a pigment prepared by crushing an evaporated aluminum thin film in an indefinite form so as to have a scale shape.

The evaporated aluminum thin film is obtained by, for example, evaporating aluminum on a base material film such as polyethylene terephthalate, forming an evaporated aluminum thin film on the base material film, and peeling the evaporated aluminum thin film from the base material film.

As the evaporated aluminum flakes, paste-form evaporated aluminum flakes may also be used.

The rolled aluminum flakes refer to a pigment prepared by crushing rolled aluminum in an indefinite form or a round form (including an elliptical form) so as to have a scale shape.

Indefinite rolled aluminum flakes are also referred to as "cornflake-like rolled aluminum flakes", and round rolled aluminum flakes are also referred to as "coin-like rolled aluminum flakes". The coin-like rolled aluminum flakes have a smooth end portion and have a flat surface.

As the rolled aluminum flakes, paste-form rolled aluminum flakes may also be used.

The amount of the (D) component is preferably 0.005% to 10% by mass and more preferably 0.01% to 5% by mass of the total mass of the photoluminescent coating material. When the amount of the (D) component in the photoluminescent coating material is too great, it becomes easy for the scale-like aluminum to overlap one another, and a fine protrusion and recess shape is formed. When a number of protrusion and recess shapes are formed, there is a tendency for it to become easy for light to be irregularly reflected. When the amount of the (D) component is 10% by mass or less, it is possible to limit the formation of a number of protrusion and recess shapes, and thus it is possible to prevent the irregular reflection of light and to maintain photoluminescence favorable. On the other hand, when the amount of the (D) component is too small, it becomes difficult to sufficiently hide the foundation.

<Optional Component>

The photoluminescent coating material may contain components other than the (A) component, the (B) component, the (C) component, and the (D) component (optional component) as necessary as long as the effect of the present invention is not impaired.

Examples of the optional component include hydrocarbon-based solvents having an aniline point of lower than 40° C. (hereinafter, also referred to as "other hydrocarbon-based solvents"), solvents that are compatible with the (A) component and the (B1) component and have a boiling point that is higher than or equal to the boiling point of the (A) component, additives, and the like.

Examples of other hydrocarbon-based solvents include benzene, toluene, xylene, ethylbenzene, isopropylbenzene, normal propylbenzene, ethylmethylbenzene, trimethylbenzene, indane, indene, diethylbenzene, dimethyl-ethylbenzene, tetramethylbenzene, 1-methyl-3-propylbenzene, 1-methyl-2-normal propyl benzene, methylindane, naphthalene, pentane, cyclopentane, cyclohexane, and the like. In addition, as solvent mixtures of other hydrocarbon-based solvents, mineral spirit, solvent naphtha, and the like are exemplary examples.

As the solvents that are compatible with the (A) component and the (B1) component and have a boiling point that is higher than or equal to the boiling point of the (A) component, ketone-based solvents, alcohol-based solvents, ester-based solvents, glycol ether-based solvents, chain-like carbonate-based solvents, and the like are exemplary examples.

Examples of the ketone-based solvents include methyl amyl ketone, cyclohexanone, diisobutyl ketone, methyl hexyl ketone, and the like.

Examples of the alcohol-based solvents include 3-methoxy-3-methyl-1-butanol, 3-methyl-1-pentanol, normal hexanol, normal heptanol, and the like.

Examples of the ester-based solvents include amyl acetate, isoamyl acetate, normalhexyl acetate, 3-methoxybutyl acetate, 3-methoxy-3-methyl-1-butyl acetate, ethyl-3-ethoxypropionate, 2-methylpropyl-2-methylpropionate, ethyl lactate, and the like.

Examples of the glycol ether-based solvents include diethylene glycol monomethyl ether, ethylene glycol monoisopropyl ether, diethylene glycol monoisopropyl ether, ethylene glycol monoethyl ether, ethylene glycol mono normal butyl ether, ethylene glycol monoisobutyl ether, dipropylene glycol monomethyl ether, propylene glycol mono normal propyl ether, ethylene glycol monoethyl ether acetate, propylene glycol monomethyl ether acetate, ethylene glycol monobutyl ether acetate, and the like.

Examples of the chain-like carbonate-based solvents include diethyl carbonate.

As the additives, a curing accelerator such as dibutyltin laurate, an extender pigment such as calcium carbonate, a coloring pigment such as carbon, a plasticizer such as dibutyl phthalate, a curing retarder such as an ester of phosphoric acid, a viscosity adjuster such as silica powder, and the like. These additives are preferably compatible with the (B1) component.

In addition, in a case where paste-form evaporated aluminum flakes or paste-form rolled aluminum flakes are used as the (D) component, an organic solvent in which these flakes are dispersed is included in any of the (A) component, the (B2) component, the (C) component, or the optional component, and an organic resin component in which the flakes are dispersed is included in any of the (B1) component or the optional component. In addition, in a case where aluminum having a surface treated with a surface treatment agent such as an aliphatic acid or a silane coupling agent is used as the (D) component, the surface treatment agent is included in the optional component.

In addition, it is preferable that the photoluminescent coating material substantially does not contain a resin or an additive that is compatible with the (A) component (hereinafter, these will also be collectively referred to as "other components that are compatible with the (A) component").

Among other components that are compatible with the (A) component, examples of the resin include slightly polar acrylic resins and the like, and examples of the additive include a levelling agent, a surface adjuster, a surfactant, and the like.

Here, the expression "substantially does not contain" means that the amount of other components that are compatible with the (A) component is less than 0.1% by mass of the total mass of the photoluminescent coating material.

<Formation of Coated Films>

An example of a process for forming a coated film using the photoluminescent coating material according to the present embodiment will be described with reference to the FIGURE.

In the following description, the photoluminescent coating material is regarded to include the (B2) component.

First, a photoluminescent coating material 10 according to the present embodiment is applied onto a base material 20 (step (a)).

The photoluminescent coating material 10 immediately after being applied onto the base material 20 includes an (A) component, a (B) component, a (C) component, and a (D) component 13. The (A) component and the (B) component are compatible with the (C) component.

A method for applying the photoluminescent coating material 10 is not particularly limited, and it is possible to employ a well-known application method, for example, a brush, a trowel, a roller, spraying, flow coating, dipping coating, shower coating, or printing, and the like.

Examples of the base material 20 include a metal base material, a plastic base material, and the like.

Examples of a material of the metal base material include aluminum, iron, nickel, chromium, titanium, copper, silver, zinc, tin, indium, magnesium, oxides thereof, alloys thereof, and the like.

Examples of a material of the plastic base material include polyesters (for example, polyethylene terephthalate, polybutylene terephthalate, and the like), polyolefins (for example, polyethylene, polypropylene, and the like), polycarbonates, acrylonitrile-butadiene-styrene copolymer resins (ABS), acrylic resins, acrylonitrile-styrene copolymer resins, acryl-styrene copolymer resins, polyvinyl chloride resins, and the like.

Next, the photoluminescent coating material 10 on the base material 20 is naturally dried or heated (step (b)).

The (C) component has a lower boiling point than the (A) component, and thus, when the photoluminescent coating material 10 is naturally dried or heated, the (C) component in the photoluminescent coating material 10 volatilizes earlier than the (A) component. At this time, when the boiling point of the (B2) component is lower than that of the (C) component, the (B2) component also volatilizes together with the (C) component, and, when the boiling point of the (B2) component is higher than that of the (C) component, only the (C) component volatilizes.

In a case where the photoluminescent coating material 10 is heated in the step (b), the heating temperature is preferably a temperature that is higher than the boiling point of the (C) component and lower than the boiling point of the (A) component.

The (A) component is a hydrocarbon-based solvent having an aniline point of 40° C. or higher, and the (B) component is a resin that is incompatible with the (A) component, and thus, when the (C) component volatilizes, the (A) component and the (B) component are separated from each other, and a layer of the (A) component (A layer) 11 and a layer of the (B) component (B layer) 12 are formed. When the polarity of the (B1) component is higher than that of the (A) component, the B layer 12 is located on the lower side of the A layer 11 as shown in the FIGURE. In addition, the (B) component attached to the surface of the base material 20 has a higher surface tension than the (A) component, and the molecules of the (B) component attract one another and seek to form the B layer 12.

As a result, it is considered that the (A) component is excluded from the B layer 12 and the A layer 11 is formed so as to cover a surface of the B layer 12 that is opposite (on a gas phase side) to a surface in contact with the base material 20. Therefore, even when the base material 20 vertically stands or the base material 20 having a vertical portion is coated, the B layer 12 is formed on the base material 20, and the A layer 11 is formed on the B layer 12.

Generally, in a case where powder is added to a plurality of liquid phases that is not compatible to each other, the powder is dispersed or precipitated in the respective liquid phases, but the (D) component 13 is scale-like aluminum. In addition, aluminum has an affinity to the (A) component and the (B) component. Therefore, the (D) component 13 is adsorbed to the interface between the A layer 11 and the B layer 12 like a surfactant, and the (D) component 13 is localized in the interface between the A layer 11 and the B layer 12. At this time, the orientation of the (D) component 13 is not constant.

In a case where the boiling point of the (B2) component is lower than that of the (C) component, the B layer 12 includes the (B1) component, but does not include the (B2) component, and, in a case where the boiling point of the (B2) component is higher than that of the (C) component, the B layer 12 includes the (B1) component and the (B2) component. In addition, in a case where the photoluminescent coating material contains an additive that is compatible with the (B1) component, the B layer 12 includes not only the (B) component but also the additive. In a case where the photoluminescent coating material contains other hydrocarbon-based solvents, some of the other hydrocarbon-based solvents are compatible with the (B) component and are included in the B layer 12. The rest of the other hydrocarbon-based solvents that exceeds the saturation amount of the (B) component (incompatible with the (B) component) are included in the A layer 11.

Next, the (A) component and the (B) component are separated from each other, and the A layer 11 and the B layer 12 are naturally dried or heated in a state in which the (D) component 13 is localized in the interface between the (A) component and the (B) component (step (c)).

With the step (c), the (A) component is volatilized. In a case where the A layer 11 includes other hydrocarbon-based solvents, the other hydrocarbon-based solvents also volatilize in the step (c). In a case where the B layer 12 includes the (B2) component or other hydrocarbon-based solvents, the (B2) component or the other hydrocarbon-based solvents also volatilize in the step (c). As a result, the A layer 11 disappears, and the B layer 12 remains on the base material 20. In the B layer 12 after the step (c), the (B1) component and the additive, as necessary, are included, and the (B2) component is almost removed.

In addition, as the (A) component volatilizes, the A layer 11 becomes thinner and soon disappears; however, in the process of the volatilization of the (A) component, the (D) component 13 is oriented on the surface of the B layer 12 parallel to the surface, and a flat film configured of the (D) component 13 is formed on the surface of the B layer 12. In the above-described manner, a photoluminescent coated film 30 including the B layer 12 and the flat film that is configured of the (D) component 13 formed on the surface of the B layer 12 is formed on the base material 20.

The heating temperature during the heating treatment in the step (c) is preferably a temperature that is higher than the boiling point of the (A) component.

In a case where the boiling point of the (B2) component is higher than that of the (A) component, the heating temperature in the step (c) is preferably a temperature that is higher than the boiling point of the (B2) component. In addition, in the step (c), the heating temperature may be increased stepwise. For example, the photoluminescent coating material may be heated at a temperature that is higher than the boiling point of the (A) component and lower than the boiling point of the (B2) component and then further heated at a temperature that is higher than the boiling point of the (B2) component.

The (D) component 13 on the surface of the B layer 12 is likely to be scratched or deteriorated due to an external cause, and thus it is preferable to coat a surface (a surface opposite to the base material 20) of the photoluminescent coated film 30 with a clear coating material to form a clear coated film <Operation Effect>

In the photoluminescent coating material according to the present embodiment, the (A) component and the (B) component are compatible with the (C) component, and the (D) component is dispersed in the coating material. However, as described above, in the formation process of coated films, first, the (C) component volatilizes, and the (A) component and the (B) component are separated from each other. At this time, in the interface between the A layer and the B layer, the (D) component is localized to a certain extent. Next, the (A) component volatilizes, whereby the (D) component is oriented on the surface of the B layer approximately fully parallel to the surface of the B layer, and a film of the (D) component is formed on the surface of the B layer.

As described above, the (D) component is oriented on the surface of the B layer parallel to the surface of the B layer, and thus excellent photoluminescence can be developed. Therefore, according to the photoluminescent coating material according to the present embodiment, it is possible to form coated films having excellent photoluminescence (photoluminescent coated films).

As described above, the (D) component has an affinity to the (A) component and the (B) component, and thus, when the (A) component and the (B) component are separated from each other, the (D) component is considered to be localized in the interface between the A layer and the B layer. In a case where a photoluminescent pigment other than the (D) component (for example, a pearl pigment or the like) is used, the photoluminescent pigment is not easily localized in the interface between the A layer and the B layer.

In addition, in order for a coated film to develop sufficient photoluminescence, the (D) component needs to be oriented on the surface of the coated film parallel to the surface of the coated film. In the present embodiment, the (A) component and the (B) component are separated from each other, the (D) component is localized in the interface between the A layer and the B layer, and then, when the (A) component volatilizes and the A layer disappears, the (D) component is oriented on the surface of the B layer parallel to the surface of the B layer. When the (A) component volatilizes and the A layer disappears, if components other than the (D) component do not remain on the B layer, the (D) component is likely to be oriented more parallel to the surface of the B layer. In order to prevent components other than the (D) component from remaining on the B layer, as described above, it is preferable that the photoluminescent coating material substantially does not contain other components that are compatible with the (A) component.

EXAMPLES

Hereinafter, the present invention will be more specifically described using examples, but the present invention is not limited thereto.

Raw materials used in the examples and comparative examples are as described below.

"Raw materials used"

<(A) Component>

A-1: Methylcyclohexane (aniline point: 40° C., boiling point: 101° C.).

A-2: Ethylcyclohexane (aniline point: 43° C., boiling point: 132° C.).

A-3: Aliphatic petroleum-based hydrocarbon (manufactured by Exxon Mobil Corporation, "Exxsol DSP 145/160", aniline point: 66° C., boiling point: 146° C. to 158° C.).

A-4: A mixture of aliphatic petroleum-based hydrocarbon and aromatic petroleum-based hydrocarbon (manufactured by Tonen General Sekiyu K. K., "T-SOL 3040 FLUID", aniline point: 52° C., boiling point: 159° C. to 187° C.).

A-5: Aliphatic petroleum-based hydrocarbon (manufactured by Exxon Mobil Corporation, "Isopar G", aniline point: 83° C., boiling point: 166° C. to 176° C.).

A-6: Xylene (aniline point: 28° C., boiling point: 144° C.).

A-7: Aromatic petroleum-based hydrocarbon (manufactured by Idemitsu Kosan Co., Ltd., "IPSOL 100", aniline point: lower than 0° C., boiling point: 159° C. to 172° C.).

<(B) Component>

B1-1: Polycarbonate diol (manufactured by Asahi Kasei Corporation, "DURANOL T5651").

B1-2: Isocyanurate-type hexamethylene diisocyanate (manufactured by Asahi Kasei Corporation, "DURANATE TPA-100").

B1-3: Polycaprolactone diol (manufactured by Daicel Corporation, "PLACCEL 210"). B1-3 is a polyester polyol.

B1-4: Acryl polyol (manufactured by Toagosei Co., Ltd., "ARUFON UH-2041").

B1-1, B1-2, and B1-3 are resins that are incompatible with the (A) component, and B1-4 is a resin that is compatible with the (A) component.

B2-1: Propylene carbonate (boiling point: 240° C.).

B2-2: Propylene glycol (boiling point: 188° C.).

B2-3: 1,4-Butanediol (boiling point: 230° C.).

B2-4: Diethylene glycol monoethyl ether acetate (boiling point: 217° C.).

B2-1, B2-2, and B2-3 are solvents that are not compatible with the (A) component, and B2-4 is a solvent that is compatible with the (A) component.

<(C) Component>

C-1: Acetone (boiling point: 56° C.).

C-2: Propylene glycol monoethyl ether (boiling point: 133° C.).

<(D) Component>

D-1: Evaporated aluminum flakes (manufactured by BASF, "Metasheen 71-0010", average particle diameter: 10 µm, thickness: 0.03 aspect ratio (average particle diameter/thickness): 333, nonvolatile component: 10% by mass, volatile component: ethyl acetate and isopropyl acetate).

D-2: Evaporated aluminum flakes (manufactured by Siberline Manufacturing Co., Inc., "STAR BRIGH 4102 EAC", average particle diameter: 12 µm, thickness: 0.04 µm, aspect ratio (average particle diameter/thickness): 300, nonvolatile component: 10% by mass, volatile component: ethyl acetate).

D-3: Aluminum flakes (manufactured by Asahi Kasei Corporation, "ASAHI-KASEI ALUMINUM PASTE FD-5060", average particle diameter: 6 µm, thickness: 0.12 µm, aspect ratio (average particle diameter/thickness): 50, nonvolatile component: 72% by mass, volatile component: mineral spirit and solvent naphtha).

D-4: Evaporated aluminum flakes surface-treated with a silane coupling agent (manufactured by ECKART, "HYDROSHINE WS 4001", average particle diameter: 10 µm, thickness: 0.04 µm, aspect ratio (average particle diameter/thickness): 250, nonvolatile component: 10% by mass, volatile component: isopropanol and ethylene glycol mono normal butyl ether (mass ratio=1:1)).

D-5: Aluminum flakes having surfaces coated with an acrylic resin (manufactured by Asahi Kasei Corporation, "ASAHI-KASEI ALUMINUM PASTE TR-5060", average particle diameter: 6 µm, thickness: 0.12 µm, aspect ratio (average particle diameter/thickness): 50, nonvolatile component: 50% by mass, volatile component: mineral spirit and solvent naphtha).

D-6: Pearl mica (manufactured by Merck & Co., "Iriogin 111 WNT").

<Optional Component>

DBTDL: Dibutyltin dilaurate.

L-95: Alkylimidazolin-based surfactant (manufactured by Kao Corporation, "HOMOGENOL L-95").

DBTDL is an additive that is incompatible with the (A) component, and L-95 is an additive that is compatible with the (A) component.

Examples 1 to 29 and Comparative Examples 1 to 8

Individual components were mixed together on the basis of formulations shown in Tables 1 to 4, thereby preparing photoluminescent coating materials.

In Tables 1 to 4, the amount of the (D) component blended is the amount of a nonvolatile component (that is, aluminum flakes or pearl mica). In addition, the header "Derived from (D)" indicates volatile components included in D-1 to D-6 (corresponding to the (C) component or the optional component).

The photoluminescent coating materials were applied onto acrylonitrile-butadiene-styrene resin plates (ABS plates) using an applicator so that the film thicknesses reached 20 µm after the step (c) (step (a)). Next, the photoluminescent coating materials on the ABS plates were dried under conditions of a temperature of 23° C. and a humidity of 50% RH for 10 minutes (step (b)), and then further dried under conditions of a temperature of 80° C. for one hour (step (c)), thereby forming coated films.

For the obtained coated films, the photoluminescence was evaluated as described below. The results are shown in Tables 1 to 4.

<Evaluation of Photoluminescence>

(Evaluation of Appearance) The appearances of the formed coated films were visually observed and evaluated using the following evaluation standards.

A: Both a short-distance view and a long-distance view are clearly reflected.

B: A short-distance view is clearly reflected, but a long-distance view becomes blurred.

C: A short-distance view becomes blurred.

(Measurement of Degree of Gloss)

For the formed coated films, the degrees of gloss at 60° were measured using a specular gloss meter (manufactured by BYK-Gardner, "Micro-Tri-Gloss µ") according to JIS Z 8741.

A greater numerical value of the degree of gloss indicates higher gloss (superior photoluminescence).

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Photoluminescent coating material [parts by mass] | (A) component | A-1 | 0 | 0 | 0 | 0 | 0 | 0 | 0 | 0 | 0 | 0 |
| | | A-2 | 0 | 25.0 | 0 | 0 | 0 | 0 | 0 | 0 | 0 | 0 |
| | | A-3 | 25.0 | 0 | 0 | 0 | 25.0 | 25.0 | 25.0 | 24.84 | 23.2 | 24.6 |
| | | A-4 | 0 | 0 | 25.0 | 0 | 0 | 0 | 0 | 0 | 0 | 0 |
| | | A-5 | 0 | 0 | 0 | 25.0 | 0 | 0 | 0 | 0 | 0 | 0 |
| | | A-6 | 0 | 0 | 0 | 0 | 0 | 0 | 0 | 0 | 0 | 0 |
| | | A-7 | 0 | 0 | 0 | 0 | 0 | 0 | 0 | 0 | 0 | 0 |
| | (B) component | B1-1 | 25.0 | 25.0 | 25.0 | 25.0 | 25.0 | 25.0 | 25.0 | 25.0 | 25.0 | 25.0 |
| | | B1-2 | 9.0 | 9.0 | 9.0 | 9.0 | 9.0 | 9.0 | 9.0 | 9.0 | 9.0 | 9.0 |
| | | B1-3 | 0 | 0 | 0 | 0 | 0 | 0 | 0 | 0 | 0 | 0 |
| | | B1-4 | 0 | 0 | 0 | 0 | 0 | 0 | 0 | 0 | 0 | 0 |
| | | B2-1 | 3.0 | 3.0 | 3.0 | 3.0 | 0 | 0 | 3.0 | 3.0 | 3.0 | 3.0 |
| | | B2-2 | 0 | 0 | 0 | 0 | 3.0 | 0 | 0 | 0 | 0 | 0 |
| | | B2-3 | 0 | 0 | 0 | 0 | 0 | 3.0 | 0 | 0 | 0 | 0 |
| | | B2-4 | 0 | 0 | 0 | 0 | 0 | 0 | 0 | 0 | 0 | 0 |
| | (C) component | C-1 | 33.99 | 33.99 | 33.99 | 33.99 | 33.99 | 33.99 | 33.99 | 37.59 | 35.79 | 37.59 |
| | | C-2 | 0 | 0 | 0 | 0 | 0 | 0 | 0 | 0 | 0 | 0 |
| | | Derived from (D) | 3.6 | 3.6 | 3.6 | 3.6 | 3.6 | 3.6 | 3.6 | 0 | 1.8 | 0 |
| | (D) component | D-1 | 0.4 | 0.4 | 0.4 | 0.4 | 0.4 | 0.4 | 0 | 0 | 0 | 0 |
| | | D-2 | 0 | 0 | 0 | 0 | 0 | 0 | 0.4 | 0 | 0 | 0 |
| | | D-3 | 0 | 0 | 0 | 0 | 0 | 0 | 0 | 0.4 | 0 | 0 |
| | | D-4 | 0 | 0 | 0 | 0 | 0 | 0 | 0 | 0 | 0.4 | 0 |
| | | D-5 | 0 | 0 | 0 | 0 | 0 | 0 | 0 | 0 | 0 | 0.4 |
| | | D-6 | 0 | 0 | 0 | 0 | 0 | 0 | 0 | 0 | 0 | 0 |
| | Optional component | DBTDL | 0.01 | 0.01 | 0.01 | 0.01 | 0.01 | 0.01 | 0.01 | 0.01 | 0.01 | 0.01 |
| | | L-95 | 0 | 0 | 0 | 0 | 0 | 0 | 0 | 0 | 0 | 0 |
| | | Derived from (D) | 0 | 0 | 0 | 0 | 0 | 0 | 0 | 0.16 | 1.8 | 0.4 |
| | | Total | 100 | 100 | 100 | 100 | 100 | 100 | 100 | 100 | 100 | 100 |
| | | Evaluation of appearance | A | A | A | A | A | A | A | A | A | A |
| | | Degree of gloss | 1423 | 1450 | 1462 | 1406 | 1412 | 1456 | 1442 | 1189 | 1176 | 1201 |

TABLE 2

| | | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|---|
| Photoluminescent coating material [parts by mass] | (A) component | A-1 | 0 | 0 | 0 | 0 | 0 | 0 | 0 | 0 | 0 | 0 | 0 |
| | | A-2 | 0 | 0 | 0 | 0 | 0 | 0 | 0 | 0 | 0 | 0 | 0 |
| | | A-3 | 25.0 | 25.0 | 25.0 | 24.84 | 23.2 | 24.6 | 25.0 | 5.0 | 10.0 | 35.0 | 40.0 |
| | | A-4 | 0 | 0 | 0 | 0 | 0 | 0 | 0 | 0 | 0 | 0 | 0 |
| | | A-5 | 0 | 0 | 0 | 0 | 0 | 0 | 0 | 0 | 0 | 0 | 0 |
| | | A-6 | 0 | 0 | 0 | 0 | 0 | 0 | 0 | 0 | 0 | 0 | 0 |
| | | A-7 | 0 | 0 | 0 | 0 | 0 | 0 | 0 | 0 | 0 | 0 | 0 |
| | (B) component | B1-1 | 0 | 25.0 | 25.0 | 25.0 | 25.0 | 25.0 | 25.0 | 25.0 | 25.0 | 25.0 | 25.0 |
| | | B1-2 | 9.0 | 9.0 | 9.0 | 9.0 | 9.0 | 9.0 | 9.0 | 9.0 | 9.0 | 9.0 | 9.0 |
| | | B1-3 | 25.0 | 0 | 0 | 0 | 0 | 0 | 0 | 0 | 0 | 0 | 0 |
| | | B1-4 | 0 | 0 | 0 | 0 | 0 | 0 | 0 | 0 | 0 | 0 | 0 |
| | | B2-1 | 3.0 | 0 | 0 | 0 | 0 | 0 | 3.0 | 3.0 | 3.0 | 3.0 | 3.0 |
| | | B2-2 | 0 | 0 | 0 | 0 | 0 | 0 | 0 | 0 | 0 | 0 | 0 |
| | | B2-3 | 0 | 0 | 0 | 0 | 0 | 0 | 0 | 0 | 0 | 0 | 0 |
| | | B2-4 | 0 | 0 | 0 | 0 | 0 | 0 | 0 | 0 | 0 | 0 | 0 |
| | (C) component | C-1 | 33.99 | 36.99 | 36.99 | 40.59 | 38.79 | 40.59 | 33.9 | 53.99 | 48.99 | 23.99 | 18.99 |
| | | C-2 | 0 | 0 | 0 | 0 | 0 | 0 | 0 | 0 | 0 | 0 | 0 |
| | | Derived from (D) | 3.6 | 3.6 | 3.6 | 0 | 1.8 | 0 | 3.6 | 3.6 | 3.6 | 3.6 | 3.6 |
| | (D) component | D-1 | 0 | 0.4 | 0 | 0 | 0 | 0 | 0.4 | 0.4 | 0.4 | 0.4 | 0.4 |
| | | D-2 | 0.4 | 0 | 0.4 | 0 | 0 | 0 | 0 | 0 | 0 | 0 | 0 |
| | | D-3 | 0 | 0 | 0 | 0.4 | 0 | 0 | 0 | 0 | 0 | 0 | 0 |
| | | D-4 | 0 | 0 | 0 | 0 | 0.4 | 0 | 0 | 0 | 0 | 0 | 0 |
| | | D-5 | 0 | 0 | 0 | 0 | 0 | 0.4 | 0 | 0 | 0 | 0 | 0 |
| | | D-6 | 0 | 0 | 0 | 0 | 0 | 0 | 0 | 0 | 0 | 0 | 0 |

TABLE 2-continued

|  |  | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Optional component | DBTDL | 0.01 | 0.01 | 0.01 | 0.01 | 0.01 | 0.01 | 0 | 0.01 | 0.01 | 0.01 | 0.01 |
|  | L-95 | 0 | 0 | 0 | 0 | 0 | 0 | 0.1 | 0 | 0 | 0 | 0 |
|  | Derived from (D) | 0 | 0 | 0 | 0.16 | 1.8 | 0.4 | 0 | 0 | 0 | 0 | 0 |
| Total |  | 100 | 100 | 100 | 100 | 100 | 100 | 100 | 100 | 100 | 100 | 100 |
| Evaluation of appearance |  | A | A | A | A | A | A | B | B | A | A | A |
| Degree of gloss |  | 1446 | 1421 | 1343 | 1289 | 1189 | 1205 | 942 | 964 | 1221 | 1331 | 1346 |

TABLE 3

|  |  |  | Example 22 | Example 23 | Example 24 | Example 25 | Example 26 | Example 27 | Example 28 | Example 29 |
|---|---|---|---|---|---|---|---|---|---|---|
| Photoluminescent coating material [parts by mass] | (A) component | A-1 | 0 | 0 | 0 | 0 | 0 | 0 | 0 | 0 |
|  |  | A-2 | 0 | 0 | 0 | 0 | 0 | 0 | 0 | 0 |
|  |  | A-3 | 25.0 | 25.0 | 10.0 | 5.0 | 25.0 | 25.0 | 5.0 | 10.0 |
|  |  | A-4 | 0 | 0 | 0 | 0 | 0 | 0 | 0 | 0 |
|  |  | A-5 | 0 | 0 | 0 | 0 | 0 | 0 | 0 | 0 |
|  |  | A-6 | 0 | 0 | 0 | 0 | 0 | 0 | 0 | 0 |
|  |  | A-7 | 0 | 0 | 0 | 0 | 0 | 0 | 0 | 0 |
|  | (B) component | B1-1 | 7.4 | 11.0 | 51.5 | 59.0 | 45.3 | 38.0 | 8.5 | 19.5 |
|  |  | B1-2 | 2.6 | 4.0 | 18.5 | 21.0 | 16.29 | 13.59 | 3.09 | 7.09 |
|  |  | B1-3 | 0 | 0 | 0 | 0 | 0 | 0 | 0 | 0 |
|  |  | B1-4 | 0 | 0 | 0 | 0 | 0 | 0 | 0 | 0 |
|  |  | B2-1 | 3.0 | 3.0 | 3.0 | 3.0 | 3.0 | 3.0 | 3.0 | 3.0 |
|  |  | B2-2 | 0 | 0 | 0 | 0 | 0 | 0 | 0 | 0 |
|  |  | B2-3 | 0 | 0 | 0 | 0 | 0 | 0 | 0 | 0 |
|  |  | B2-4 | 0 | 0 | 0 | 0 | 0 | 0 | 0 | 0 |
|  | (C) component | C-1 | 57.99 | 52.99 | 12.99 | 7.99 | 6.4 | 16.4 | 76.4 | 56.4 |
|  |  | C-2 | 0 | 0 | 0 | 0 | 0 | 0 | 0 | 0 |
|  |  | Derived from (D) | 3.6 | 3.6 | 3.6 | 3.6 | 3.6 | 3.6 | 3.6 | 3.6 |
|  | (D) component | D-1 | 0.4 | 0.4 | 0.4 | 0.4 | 0.4 | 0.4 | 0.4 | 0.4 |
|  |  | D-2 | 0 | 0 | 0 | 0 | 0 | 0 | 0 | 0 |
|  |  | D-3 | 0 | 0 | 0 | 0 | 0 | 0 | 0 | 0 |
|  |  | D-4 | 0 | 0 | 0 | 0 | 0 | 0 | 0 | 0 |
|  |  | D-5 | 0 | 0 | 0 | 0 | 0 | 0 | 0 | 0 |
|  |  | D-6 | 0 | 0 | 0 | 0 | 0 | 0 | 0 | 0 |
|  | Optional component | DBTDL | 0.01 | 0.01 | 0.01 | 0.01 | 0.01 | 0.01 | 0.01 | 0.01 |
|  |  | L-95 | 0 | 0 | 0 | 0 | 0 | 0 | 0 | 0 |
|  |  | Derived from (D) | 0 | 0 | 0 | 0 | 0 | 0 | 0 | 0 |
| Total |  |  | 100 | 100 | 100 | 100 | 100 | 100 | 100 | 100 |
| Evaluation of appearance |  |  | A | A | A | A | B | A | A | A |
| Degree of gloss |  |  | 1100 | 1102 | 1375 | 1468 | 925 | 1108 | 1295 | 1350 |

TABLE 4

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Photoluminescent coating material [parts by mass] | (A) component | A-1 | 0 | 0 | 0 | 0 | 0 | 25.0 | 0 | 0 |
|  |  | A-2 | 0 | 0 | 0 | 0 | 0 | 0 | 0 | 0 |
|  |  | A-3 | 0 | 0 | 0 | 0 | 0 | 0 | 49.84 | 25.0 |
|  |  | A-4 | 0 | 0 | 25.0 | 0 | 0 | 0 | 0 | 0 |
|  |  | A-5 | 0 | 0 | 0 | 0 | 0 | 0 | 0 | 0 |
|  |  | A-6 | 25.0 | 0 | 0 | 0 | 0 | 0 | 0 | 0 |
|  |  | A-7 | 0 | 25.0 | 0 | 0 | 0 | 0 | 0 | 0 |
|  | (B) component | B1-1 | 25.0 | 25.0 | 0 | 25.0 | 25.0 | 25.0 | 25.0 | 25.0 |
|  |  | B1-2 | 9.0 | 9.0 | 9.0 | 9.0 | 9.0 | 9.0 | 9.0 | 9.0 |
|  |  | B1-3 | 0 | 0 | 0 | 0 | 0 | 0 | 0 | 0 |
|  |  | B1-4 | 0 | 0 | 25.0 | 0 | 0 | 0 | 0 | 0 |
|  |  | B2-1 | 3.0 | 3.0 | 3.0 | 0 | 3.0 | 3.0 | 15.59 | 3.0 |
|  |  | B2-2 | 0 | 0 | 0 | 0 | 0 | 0 | 0 | 0 |

TABLE 4-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
|  | B2-3 | 0 | 0 | 0 | 0 | 0 | 0 | 0 | 0 |
|  | B2-4 | 0 | 0 | 0 | 28.0 | 0 | 0 | 0 | 0 |
| (C) component | C-1 | 33.99 | 33.99 | 33.99 | 33.99 | 58.99 | 0 | 0 | 37.59 |
|  | C-2 | 0 | 0 | 0 | 0 | 0 | 33.99 | 0 | 0 |
|  | Derived from (D) | 3.6 | 3.6 | 3.6 | 3.6 | 3.6 | 3.6 | 0 | 0 |
| (D) component | D-1 | 0.4 | 0.4 | 0.4 | 0.4 | 0.4 | 0.4 | 0 | 0 |
|  | D-2 | 0 | 0 | 0 | 0 | 0 | 0 | 0 | 0 |
|  | D-3 | 0 | 0 | 0 | 0 | 0 | 0 | 0.4 | 0 |
|  | D-4 | 0 | 0 | 0 | 0 | 0 | 0 | 0 | 0 |
|  | D-5 | 0 | 0 | 0 | 0 | 0 | 0 | 0 | 0 |
|  | D-6 | 0 | 0 | 0 | 0 | 0 | 0 | 0 | 0.4 |
| Optional component | DBTDL | 0.01 | 0.01 | 0.01 | 0.01 | 0.01 | 0.01 | 0.01 | 0.01 |
|  | L-95 | 0 | 0 | 0 | 0 | 0 | 0 | 0 | 0 |
|  | Derived from (D) | 0 | 0 | 0 | 0 | 0 | 0 | 0.16 | 0 |
|  | Total | 100 | 100 | 100 | 100 | 100 | 100 | 100 | 100 |
|  | Evaluation of appearance | C | C | C | C | C | C | — | C |
|  | Degree of gloss | 755 | 762 | 289 | 708 | 697 | 398 | — | 407 |

As is clear from Tables 1 to 3, the coated films formed of the photoluminescent coating materials obtained in the respective examples had excellent photoluminescence.

Particularly, the coated films formed of the photoluminescent coating materials obtained in Examples 1 to 16 and 18 to 29 for which the additive that is compatible with the (A) component (alkyl imidazoline-based surfactant) was not used were superior in photoluminescence to the coated film formed of the photoluminescent coating material obtained in Example 17 for which the additive that was compatible with the (A) component was used. In the case of Example 17, it is considered that the interface between the A layer and the B layer was formed, and the (D) component was localized in the interface between the A layer and the B layer, but some of the (D) component was not oriented fully parallel, and thus the photoluminescence degraded compared to those in the cases of Examples 1 to 16 and 18 to 29.

On the other hand, as is clear from Table 4, in the case of Comparative Examples 1 and 2 in which A-6 or A-7 having an aniline point of lower than 40° C. was used, the (A) component and the (B) component were not separated from each other, and thus the interface between the A layer and the B layer was not sufficiently formed, and the (D) component was not localized.

In the case of Comparative Example 3 in which B1-4 that was compatible with the (A) component was used, the (A) component and the (B) component were not separated from each other, and thus the interface between the A layer and the B layer was not sufficiently formed, and the (D) component was not localized.

In the case of Comparative Examples 4 and 5 in which the (A) component was not included, the interface between the A layer and the B layer was not formed, and the (D) component was not localized.

In the case of Comparative Example 6 in which C-2 having a higher boiling point than the (A) component was used, the (A) component and the (B) component were not separated from each other, and thus the interface between the A layer and the B layer was not sufficiently formed, and the (D) component was not localized.

In the case of Comparative Example 8 in which D-6 that was a pearl pigment was used, the interface between the A layer and the B layer was formed, but D-6 was not localized in the interface between the A layer and the B layer.

Therefore, the coated films formed of the photoluminescent coating materials obtained in Comparative Examples 1 to 6 and 8 had poor photoluminescence.

In the case of Comparative Example 7 in which the (C) component was not used, the (A) component and the (B) component were separated from each other in the coating material, and coating was not possible.

Hitherto, the preferred examples of the present invention have been described, but the present invention is not limited to these examples. Additions, omissions, substitutions, and other modifications of the configuration are possible within the scope of the gist of the present invention. The present invention is not limited by the above description and is limited only by the accompanying claims.

BRIEF DESCRIPTION OF THE REFERENCE SYMBOLS

10 PHOTOLUMINESCENT COATING MATERIAL
11 A LAYER
12 B LAYER
13 (D) COMPONENT
20 BASE MATERIAL
30 PHOTOLUMINESCENT COATED FILM

What is claimed is:
1. A photoluminescent coating material comprising:
a hydrocarbon-based solvent (A) that has an aniline point of 40° C. or higher;
a resin (B1) that is incompatible with the hydrocarbon-based solvent (A);
an organic solvent (C) that is compatible with the hydrocarbon-based solvent (A) and the resin (B1), while having a lower boiling point than the hydrocarbon-based solvent (A); and
a scale-like aluminum (D),
wherein the hydrocarbon-based solvent (A) and the resin (B1) are dissolved in the organic solvent (C), the hydrocarbon-based solvent (A) and the organic solvent (C) are not separated from each other, the resin (B1) and the organic solvent (C) are not separated from each other, and an interface is not generated between the hydrocarbon-based solvent (A) including the organic solvent (C) and the resin (B1) including the organic solvent (C), wherein the hydrocarbon-based solvent (A) is 5% to 40% by mass of the total mass of the photoluminescent coating material, and comprises at least one or more of an aliphatic hydrocarbon or an unsaturated hydrocarbon, wherein the resin (B1) is 10% to 80% by mass of the total mass of the photoluminescent coating material, wherein the organic solvent (C) is 10% to 80% by mass of the total mass of the photoluminescent coating material, and wherein a molecule of the resin (B1) comprises one or more of a hydroxy group, a carboxy group, or an ether bond, where, incompatible means that the hydrocarbon-based solvent (A) and the resin (B1) are separated from each other and an interface is formed between the hydrocarbon-based solvent (A) and the resin (B1), and compatible means that the organic solvent (C) and the hydrocarbon-based solvent (A), and the organic solvent (C) and the resin (B1) are not separated from each other and no interface is formed between the organic solvent (C) and the resin (B1) or the organic solvent (C) and the hydrocarbon-based solvent (A).

2. The photoluminescent coating material according to claim 1,
wherein a polarity of the resin (B1) is higher than a polarity of the hydrocarbon-based solvent (A).

3. The photoluminescent coating material according to claim 1,
wherein the organic solvent (C) comprises one or more of ketone-based solvents, alcohol-based solvents, ether-based solvents, ester-based solvents, glycol ether-based solvents, or carbonate-based solvents.

4. The photoluminescent coating material according to claim 1, wherein the hydrocarbon-based solvent (A) comprises one or more of an aliphatic hydrocarbon or an unsaturated hydrocarbon.

5. The photoluminescent coating material according to claim 3, wherein the hydrocarbon-based solvent (A) comprises one or more of an aliphatic hydrocarbon or an unsaturated hydrocarbon.

6. The photoluminescent coating material according to claim 1,
further comprising an organic solvent (B2) that is not compatible with the hydrocarbon-based solvent (A),
wherein the organic solvent (B2) is 0% or more and 60% or less by mass of the total mass of the photoluminescent coating material,
wherein a molecule of the organic solvent (B2) comprises one or more of a keto group, a hydroxy group, or a carboxy group, and
wherein a component other than the hydrocarbon-based solvent (A), the resin (B1), the organic solvent (B2), and organic solvent (C) is 0% or more and 1.81% or less by mass of the total mass of the photoluminescent coating material.

* * * * *